Figure 1:
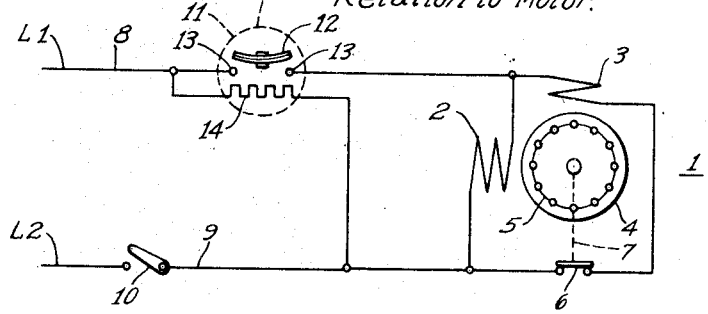

Aug. 21, 1945.   D. E. FRITZ   2,383,303

DELAYED-START CONNECTION FOR ELECTRIC MOTORS

Original Filed July 14, 1942

WITNESSES:
C. J. Weller.
F. P. Lyle

INVENTOR
Dwain E. Fritz.
BY O. B. Buchanan
ATTORNEY

Patented Aug. 21, 1945

2,383,303

UNITED STATES PATENT OFFICE 2,383,303

DELAYED-START CONNECTION FOR ELECTRIC MOTORS

Dwain E. Fritz, Wapakoneta, Ohio, assignor to Westinghouse Electric Corporation, East Pittsburgh, Pa., a corporation of Pennsylvania Original application July 14, 1942, Serial No. 450,844. Divided and this application April 14, 1944, Serial No. 530,974

3 Claims. (Cl. 172—279)

The present invention relates to self-starting single-phase electric motors and, more particularly, to a connection or control means for delaying the starting of such motors for a predetermined time interval after the motor terminals are energized. The present application is a division of my prior copending application, Serial No. 450,844, filed July 14, 1942, now Patent No. 2,363,310, issued November 21, 1944.

The delayed-start connection means of the present invention is especially adapted for use with electric motors used for driving fans or blowers in unit heaters. Such heaters require a certain time to become heated after the gas, or other heating means, is ignited or energized, and it is not desirable to start the fan in operation until the heater has become sufficiently heated, so as to avoid blowing cold air into the room. For this reason, it is desirable to delay the starting of the motor which drives the fan for a certain time interval after the heater itself has been energized, and this is most conveniently done by providing for a time delay in the starting means or control of the motor.

The principal object of the present invention is to provide a simple and reliable time-delay connection means for causing an electric motor to start in operation, or to become energized, at a predetermined time after energy has been applied to the motor terminals.

A more specific object of the invention is to provide a time-delay connection for delayed starting of electric motors which includes a thermally-responsive switch of the type in which the contacts are normally open, and which has a heating element for heating it to the temperature at which the contacts close to energize the motor, the switch being mounted in direct heat-receiving relation to the motor, so that when the motor is initially hot the time-delay will be less. This is a desirable feature in unit heater applications, since, if the heater has previously been in operation and still retains some heat, less time is required for it to become sufficiently hot, and it is, therefore, desirable to reduce the time-delay in starting the motor.

A further object of the invention is to provide a delayed-start connection for the control of electric motors which includes a thermally-responsive switch for energizing the motor together with heating means for initially heating the switch to its operating temperature and additional heating means for maintaining the switch at a high enough temperature to cause it to remain in closed position, the initial heating means being operative only while the motor is being started.

Figure 2:
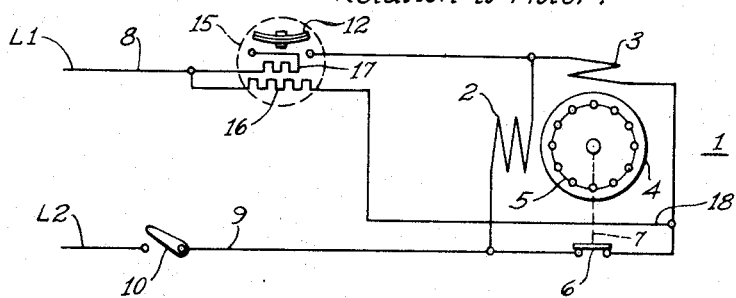

The invention will be more fully understood from the following detailed description, taken in connection with the accompanying drawing, in which:

Figures 1 and 2 are schematic diagrams showing different embodiments of the invention.

Figure 1 shows a simple embodiment of the invention for the delayed starting of a single-phase motor 1. Any suitable type of single-phase motor may be used in this circuit. The motor shown for the purpose of illustration is of the split-phase type, having a main primary winding 2 and an auxiliary or starting primary winding 3, which are displaced from each other on the stator frame of the motor and which are so designed that their currents are displaced in phase. The motor also has a rotor member 4 which carries a suitable secondary winding 5, shown as a squirrel-cage winding. A centrifugal or other type of speed-responsive switch 6 is connected in the circuit of the auxiliary winding 3, and is arranged to be actuated by the rotor 4 when the motor reaches a predetermined speed of rotation, as indicated by the dotted connection 7, so as to disconnect the auxiliary winding 3 after the motor has accelerated to the predetermined speed.

The motor 1 has line terminals 8 and 9, and a suitable line switch 10 is provided for connecting the motor to a single-phase supply line L1, L2. In order to effect the desired time-delay in starting the motor, a thermally-responsive switch 11 is connected in series in one of the motor terminals. The switch 11 is of the so-called "inverted" thermostatic type, in which the contacts are normally open and which closes its contacts when the switch is heated to a predetermined temperature. Thus, as shown in the drawing, the switch consists of a bimetallic element 12, which is preferably a disc, or other snap-acting device, and contacts 13, which are bridged by the bimetallic element 12 when it is heated above a predetermined temperature. The thermally-responsive switch 11 is preferably mounted in direct heat-receiving relation to the motor 1, as by mounting it directly on the motor frame, and it also has additional heating means for heating it independently of heat from the motor. This heating means preferably comprises an electric heating element 14, which is connected directly across the motor terminals 8 and 9 on the line side of the thermally-responsive switch 11.

The operation of this delayed-start connection should now be apparent. To start the motor, the line switch 10 is closed to energize the motor terminals 8 and 9 from the supply line, but the motor itself is not energized because the thermally-responsive switch 11 is open. Closing of the line switch 10, however, also connects the heating element 14 directly across the line L1, L2, so that current flows through the heating element and it begins to generate heat. The heat produced by the heating element 14 raises the temperature of the bimetallic element 12, and after a predetermined time interval, which may be of the order of thirty to sixty seconds, for example, the bimetallic element 12 reaches the temperature at which it operates, and bridges the contacts 13, completing the connection of the motor windings to the line so that the motor starts.

Thus, if the burner of a unit heater is ignited at the same time that the fan motor line switch 10 is closed, which is the customary arrangement, the motor does not start until a definite time interval has elapsed and no air is blown through the heater until it has had time to become heated. In case the heater has previously been in operation, so that some heat still remains in it, the motor will also be warm, and since the thermally-responsive switch 11 is in direct heat-receiving relation to the motor, it will not take as long for the bimetallic element 12 to become heated to its operating temperature, and the time-delay period is accordingly reduced, which is desirable under these conditions as it does not take the heater as long to become sufficiently hot.

Another embodiment of the invention is shown in Fig. 2. The motor 1 shown in this figure is identical to that shown in Fig. 1, and its terminals 8 and 9 are connected to the line in the same way. The thermally-responsive switch 15 connected in series with the line terminal 8 is generally similar to the switch 11 described above, and has an electric heating element 16 similar to the heating element 14, but it also has a smaller auxiliary heating element 17. The heating element 16 is connected across the line, one end of the heating element 16 being connected on the line side of the thermally-responsive switch 15, while the other end is connected between the speed-responsive switch 6 and the auxiliary motor-winding 3, as indicated at 18. The auxiliary heating element 17 is connected in series with the contacts of the thermally-responsive switch 15.

In the operation of this embodiment of the invention, the heating element 16 is energized when the line switch 10 is closed, since it is connected directly across the supply line through the speed-responsive switch 6, which is closed when the motor is at rest. The heating element 16, therefore, supplies heat to the bimetallic element 12, and when the element 12 has reached its operating temperature after a predetermined time delay, the contacts of the switch 15 are closed and the motor starts to accelerate. When the motor has reached a predetermined speed, the speed-responsive switch 6 operates to disconnect the auxiliary winding 3 from the line, and this operation of the switch 6 also disconnects the heating element 16, which is connected on the motor-winding side of the switch 6. The auxiliary heating element 17, however, is connected in series with the thermal switch 15, so that it is energized by closure of the switch contacts. The heating element 17 is designed to provide sufficient heat to keep the temperature of the thermal switch 15 above its operating temperature, so that its contacts remain closed and the motor remains connected to the line. It will be seen, therefore, that this embodiment of the invention is similar in its operation to that shown in Fig. 1, but that the main heating element 16 is disconnected after the thermal switch 15 has been initially heated up, and a small auxiliary heating element is used during operation of the motor to provide sufficient heat to keep the thermal switch contacts closed.

The delayed-start connection of the present invention has numerous practical advantages, particularly in its application to unit heater fan motors. A so-called "inverted" thermostatic switch is used to effect the time-delay, which is readily available commercially in suitable sizes and ratings, and the heating element which is used with this switch is relatively simple and inexpensive to design and produce, so that the cost of the control system is very low. An important advantage of this arrangement is that during the time-delay period the motor windings themselves are not energized. In some delayed-start connections which have previously been used, one or more of the motor windings are energized during the time-delay interval in such a manner that the motor does not start. This energization of the windings causes an objectionable hum, which is picked up and amplified by the large amount of sheet metal customarily present in unit heaters, so that a distinctly objectionable noise is produced. This disadvantage is entirely eliminated in the present invention, since the motor windings are not energized at all until the motor actually starts. The embodiment of Fig. 2 has the further advantage that the main heating element 16 is energized only for initially heating the thermal switch and is deenergized when the motor comes up to speed, the small auxiliary heating element 17 being used to maintain the temperature of the switch high enough to keep it closed. Thus, a continuous energy loss in the main heating element is avoided and a material saving is effected. It is apparent, therefore, that the arrangement of the present invention has numerous advantages for any application in which delayed starting of an electric motor is desired, and although it has been described specifically with reference to its use with unit heater motors, it will be understood that its usefulness is not necessarily restricted to this application, but that it may be used to advantage in many other applications where the characteristics described are desirable.

It will be apparent that, although certain specific embodiments of the invention have been described for purposes of illustration, the invention is capable of various other embodiments and modifications, and it is to be understood, therefore, that the invention is not limited to the particular arrangements shown, but in its broadest aspects it includes all equivalent embodiments and modifications which come within the scope of the appended claims.

I claim as my invention:

1. A delayed-start electric motor having primary and secondary windings, connection means for connecting said primary windings to a supply line, said connection means including a thermally-responsive switch means, said thermally-responsive switch means having contacts which are normally open and being adapted to close its contacts when it is heated to a predetermined temperature, said switch means being located in direct heat-receiving relation to the motor and also having an electric heating element, means for connecting said heating element across the supply line to be energized thereby, means for disconnecting the heating element from the supply line in response to starting of the motor, and auxiliary heating means for heating the thermally-responsive switch during operation of the motor.

2. A delayed-start electric motor having a main primary winding and an auxiliary primary winding, means for connecting said motor to an electric supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for heating said switch, means for connecting said electric heating element across the supply line to initially heat said thermally-responsive switch to cause it to close its contacts and energize the motor, means for disconnecting the electric heating element from the line after the motor has started, and auxiliary heating means for the thermally-responsive switch, said auxiliary heating means being energized by closure of the switch contacts.

3. A delayed-start electric motor having a main primary winding and an auxiliary primary winding, means for connecting said motor to an electric supply line, speed-responsive switch means for disconnecting said auxiliary winding when the motor has reached a predetermined speed, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for heating said switch, said electric heating element being connected between the line side of said thermally responsive switch and the motor winding side of said speed-responsive switch, whereby the heating element is connected directly across the supply line when the motor is starting and is disconnected from the line when the speed-responsive switch operates, and an auxiliary heating element for the thermally-responsive switch connected in series therewith.

DWAIN E. FRITZ.